United States Patent [19]
Nash et al.

[11] 3,837,411
[45] Sept. 24, 1974

[54] DIVERTER VALVE FOR A GAS TURBINE WITH AN AUGMENTER

[75] Inventors: Dudley O. Nash, Cincinnati; Charles S. Lyons, West Chester; Ronald C. Hollett, Cincinnati, all of Ohio

[73] Assignee: General Electric Company, Cincinnati, Ohio

[22] Filed: Nov. 21, 1973

[21] Appl. No.: 417,954

[52] U.S. Cl............. 137/610, 60/230, 239/265.29, 239/265.37, 244/110 B
[51] Int. Cl............................................ B64c 15/06
[58] Field of Search..... 239/265.19, 265.29, 265.35, 239/265.37; 244/12 D, 23 D, 110 B; 60/230; 137/610

[56] References Cited
UNITED STATES PATENTS

| | | | |
|---|---|---|---|
| 2,964,905 | 12/1960 | Hewson et al. | 239/265.29 |
| 3,434,666 | 3/1969 | Shaw | 239/265.19 |
| 3,587,973 | 6/1971 | Wolf | 239/265.19 X |
| 3,614,037 | 10/1971 | Vdolek | 239/265.19 X |
| 3,690,561 | 9/1972 | Potter | 239/265.29 |
| 3,690,562 | 9/1972 | Smale | 239/265.29 |
| 3,703,258 | 11/1972 | Wildner | 239/265.29 |

*Primary Examiner*—William R. Cline
*Assistant Examiner*—Ira S. Lazarus
*Attorney, Agent, or Firm*—Derek P. Lawrence; Lee H. Sacks

[57] ABSTRACT

A gas turbine having an augmenter has an exhaust duct and a cooling liner fixed interiorly of the exhaust duct to define an annular space, with portions of both the duct wall and liner wall removed to form openings. A pair of blocker doors are mounted to the duct wall for rotation between a stowed position and an operative position. When the blocker doors are in their stowed position, they replace the removed portions of the duct wall, and an axially translatable liner section replaces the removed portion of the liner wall. When the blocker doors are rotated to their operative position, the liner section is simultaneously translated into telescoping relation with the liner to expose the opening in the liner wall.

11 Claims, 7 Drawing Figures

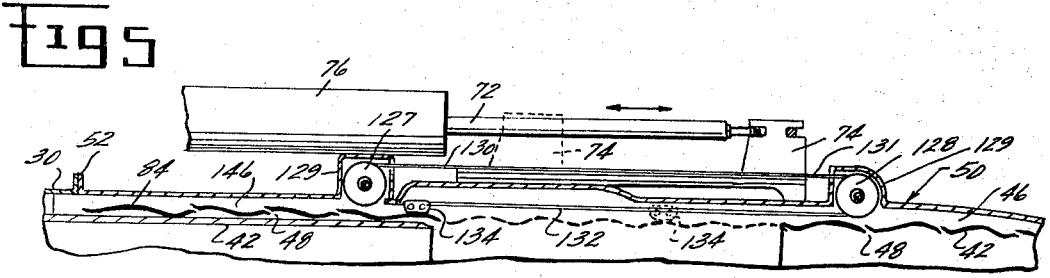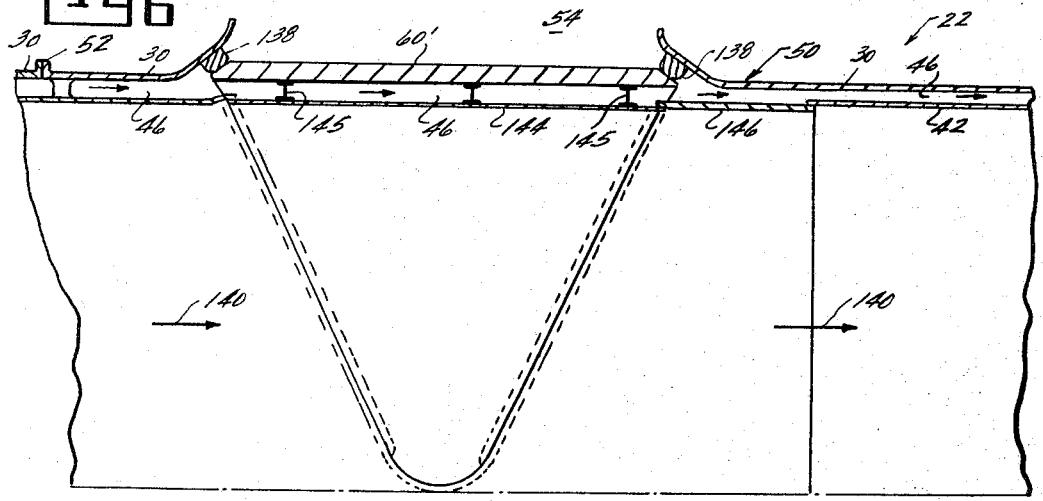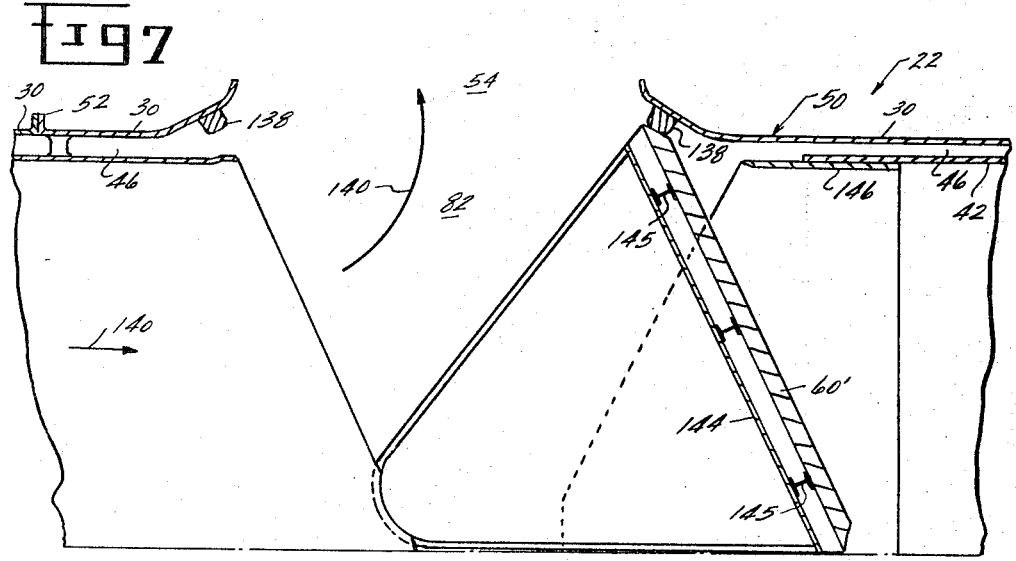

DIVERTER VALVE FOR A GAS TURBINE WITH AN AUGMENTER

BACKGROUND OF THE INVENTION

1. Field of the Invention

This invention relates to a gas turbine and more particularly to a diverter valve for controlling the direction of the discharge stream of a gas turbine.

2. Description of the Prior Art

There are many arrangements known in the prior art for diverting the discharge stream of gas turbine jet engines. In aircraft powered by gas turbine jet engines, the discharge stream is normally directed from a discharge nozzle which is coaxial with the engine axis so that the resultant thrust acts in a direction which propels the aircraft forward. However, it is often desired to divert the discharge stream in order to provide thrust in a direction other than coaxially with the engine axis. One purpose for diverting the discharge stream is to provide a reverse thrust component to either aid braking after the aircraft has landed or to aid maneuverability in flight. Another typical purpose is to provide a vertical thrust component by diverting the discharge stream to use it directly to provide a vertical thrust component, to enable its use as motive fluid for a "lift fan," or to direct it into auxiliary nozzles oriented to provide a vertical thrust component.

Those arrangements used to divert the discharge stream in order to provide reverse thrust are appropriately named "thrust reversers" and are generally characterized as one of two types, depending on their location with respect to the exhaust duct of the engine.

The first type is called an "impulse" or "target" thrust reverser, which, when in the reverse thrust mode, is located externally of the exhaust duct of the engine. When the engine is in the forward thrust mode, the impulse thrust reverser is stowed so that an aerodynamic configuration is presented to the airflow around the aircraft. When reverse thrust is desired, the impulse thrust reverser is brought into an operative position aft of the exhaust duct of the engine in order to block the discharge stream and turn it in a foward direction, which provides the desired reverse thrust component. Impulse thrust reversers are generally unsuitable for providing a reverse thrust component while the aircraft is in flight because turbulence is created behind it due to the fact that it is disposed externally of the exhaust duct when in its operative position. This turbulence imparts aerodynamic instability to the thrust reverser, which degrades aircraft performance and is highly undesirable from a structural standpoint of both the aircraft and the thrust reverser. In order to withstand such aerodynamic instability, the thrust reverser, engine and aircraft, in order for the reverser to be usable during flight, would have to be built to withstand the loads due to this instability and therefore would be extremely heavy and impractical for use.

In order to overcome the problem of aerodynamic instability when it is desired to have a reverse thrust component during flight, the second type, a "reaction" thrust reverser, is generally used. The reaction thrust reverser is located internally of the exhaust duct of the engine. When no reverse thrust component is desired, the raction thrust reverser is located out of the discharge stream in the exhaust duct. When a reverse thrust component is desired, the exhaust duct is blocked by a diverter valve and the discharge stream passes through an opening or openings in the wall of the exhaust duct. Turning vanes are usually provided in the exhaust duct openings to aid in directing the discharge stream forward. The reaction thrust reverser may be used while the aircraft is in flight without producing aerodynamic instability caused by the impulse thrust reverser due to the fact that the reaction thrust reverser is internal of the exhaust duct and does not interrupt the airflow around the engine.

Further enhancing its desirability, the concept which is utilized by the reaction thrust reverser is also adaptable for diverting the discharge stream for uses other than producing reverse thrust. It is merely necessary to fashion the diverter valve, exhaust duct openings, and vanes in an appropriate manner so that the exhaust flow is directed as desired. It is therefore more accurate to refer to such a configuration as a "reaction type diverter" since it has wider application than merely its use as a thrust reverser.

Previously, the reaction type diverter has been subject to limitations when it was desired to have the capability of diverting the discharge stream of an engine having a augmenter because of the necessity of providing the exhaust duct of such an engine with a cooling liner. The liner is precisely located interiorly of the exhaust duct, coaxial therewith, to define an annular space, and either non-carbureted air from the fan discharge or turbine discharge is diverted into the annular space. The liner is formed with carefully arranged, circumferentially extending slots through which this air flows in order to provide a film of cool air against the liner to protect it from the extreme heat of the discharge stream while the augmenter is operative. Precise structure and placement of the liner is necessary to insure that the correct amount of cooling air is used so that engine performance is not unduly penalized while sufficient cooling is provided. Because the reaction type diverter directs the discharge stream through an opening in the exhaust duct, an opening must also be provided in the liner. Obviously, the necessity of a cooling liner directly conflicts with the necessity of providing an opening therein in order to permit the discharge stream to flow therethrough. When the requirement of precise structure and placement of the cooling liner is added, the problem is compounded.

Another problem connected with the use of a reaction type diverter during flight arises from the desire to have the capability of having forward thrust while diverting only a part of the discharge stream so that the aircraft attitude or speed can be more accurately controlled. A gas turbine jet engine must have an exhaust area which is matched to other flow requirements of the engine. Either a too small or too large exhaust area will greatly degrade the performance of the engine. When a reaction type diverter is used to divert only a portion of the exhaust flow, it is desirable that the total exhaust area through the partially operative diverter and the openings in the exhaust duct be the same as that which the engine would "see" if it were running with the diverter completely inoperative, that is, with full forward thrust. In order to accomplish this, it is necessary to provide area variation of the openings in the exhaust duct.

In order to overcome these problems, the present invention proposes an arrangement in which a reaction type diverter may be used with a gas turbine jet engine having an augmenter. This is accomplished by providing an opening in the cooling liner when the exhaust gases are to be diverted, while insuring the necessary integrity of the liner when the augmenter is operative.

SUMMARY OF THE INVENTION

It is a general object of this invention to provide a new and improved arrangement for diverting the discharge stream of a gas turbine having an exhaust duct with a cooling liner.

In accordance with the present invention, a diverter valve controls the direction of the discharge stream of a gas turbine. The diverter valve includes the exhaust duct of the gas turbine, wherein a portion of the duct wall is removed to form an opening, and the liner, which is fixed interiorly of the exhaust duct to define an annular space, wherein a portion of the liner wall is removed to form an opening. At least one blocker door is mounted to the duct wall for rotation about an axis transverse to the axis of the exhaust duct. The blocker door has a stowed position wherein it replaces the removed portion of the exhaust duct and an operative position wherein it extends transversely into the discharge stream through the opening in the liner to divert at least a portion of the discharge stream through the openings in the duct and liner walls. A movable liner section is provided which occupies a first position when the blocker door is in its stowed position and a second position when the blocker door is in its operative position. When the liner section is in its first position, it replaces the removed portion of the liner wall and when it is in its second position, at least a portion of the opening in the liner wall is exposed.

BRIEF DESCRIPTION OF THE DRAWINGS

A more complete understanding of the invention may be had by reference to the accompanying specification when taken in conjunction with the drawings of the invention, wherein:

FIG. 5 is a detailed view of an actuation mechanism used to axially translate a liner section according to one embodiment of the present invention;

FIG. 6 is a detailed view of the exhaust duct of the gas turbine shown in FIG. 1 showing a diverter valve according to a second embodiment of the present invention in its stowed position; and FIG. 7 is a detailed view of the exhaust duct of the gas turbine shown in FIG. 1 showing the diverter valve shown in FIG. 6 in its operative position.

DETAILED DESCRIPTION OF THE INVENTION

Figure 1:
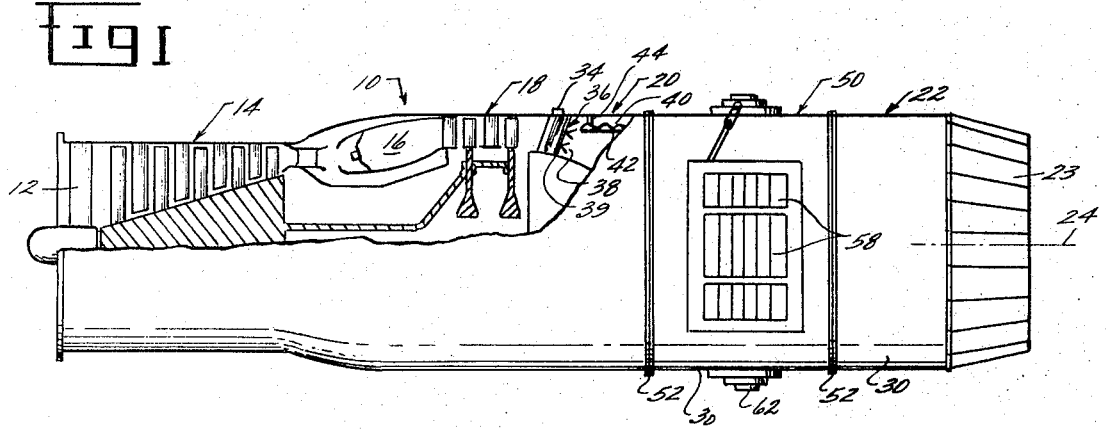
FIG. 1 shows a schematic of a gas turbine partially in section.

Referring now to FIG. 1, a gas turbine jet engine 10 has an inlet 12, compressor 14, combustor 16, turbine 18, augmenter 20, exhaust duct 22 and variable area discharge nozzle 23. Exhaust duct 22 is coaxial with gas turbine 10 and has a cylindrical duct wall 30. Discharge nozzle 23 is secured to the aft end of exhaust duct 22, the discharge stream of the gas turbine 10 being expanded through discharge nozzle 23 in order to provide thrust in the direction of axis 24 of gas turbine 10, although a different orientation of discharge nozzle 23 or exhaust duct 22 may be used to provide thrust in any desired direction without departing from the spirit of the present invention. Augmenter 20 comprises a plurality of fuel spray bars 34 (only one of which is shown for clarity) which are located upstream of a flameholder 36. Flameholder 36 is conventional in construction, having a pair of radially spaced, circumferentially extending gutters 38, connected by a plurality of radially directed gutters 39 (only one of which is shown for clarity). Augmenter 20 is operated by introducing fuel through spray bars 34 and creating a flame by lighting-off the fuel, which flame stabilizes on flameholder 36.

A cooling liner 40 has a cylindrical liner wall 42 which is suitably fixed interiorly of exhaust duct 22, as by hangers 44, to define an annular space 46 between duct wall 30 and liner wall 42. When augmenter 20 is operative, flames which stabilize on flameholder 36 extend aft into exhaust duct 22 and thus expose exhaust duct 22 to extremely high temperatures. Liner wall 42 prevents these flames from directly contacting duct wall 30 and relatively cooler turbine discharge or fan air is introduced into annular space 46, thus maintaining the structural integrity of duct wall 30. While cooling liner 40 has no function beyond protecting duct wall 30, liner wall 42 would soon be destroyed by these high temperatures unless it was also cooled. This cooling is accomplished by providing slots 48 (see FIG. 2) through which a small portion of the cooling air flowing in annular space 46 can exit to form a film on liner wall 42. In order to minimize performance losses, annular space 46 and slots 48 are carefully sized so that only a minimum amount of cooling air is needed to maintain the integrity of duct wall 30 and liner wall 42.

Referring now to FIGS. 1 through 5, a diverter valve 50 according to one embodiment of the present invention is shown. Exhaust duct wall 30 is conveniently made in sections which are bolted together at flanges 52. In that section of duct wall 30 between flanges 52, openings 54 are formed by removing portions of the duct wall 30. Openings 54 are disposed at diametrically opposed locations around duct wall 30. Each opening 54 includes a plurality of vanes 58, comprising cascades therein, which vanes have the capability of pitch variation in order to control the area of openings 54.

Figure 2:
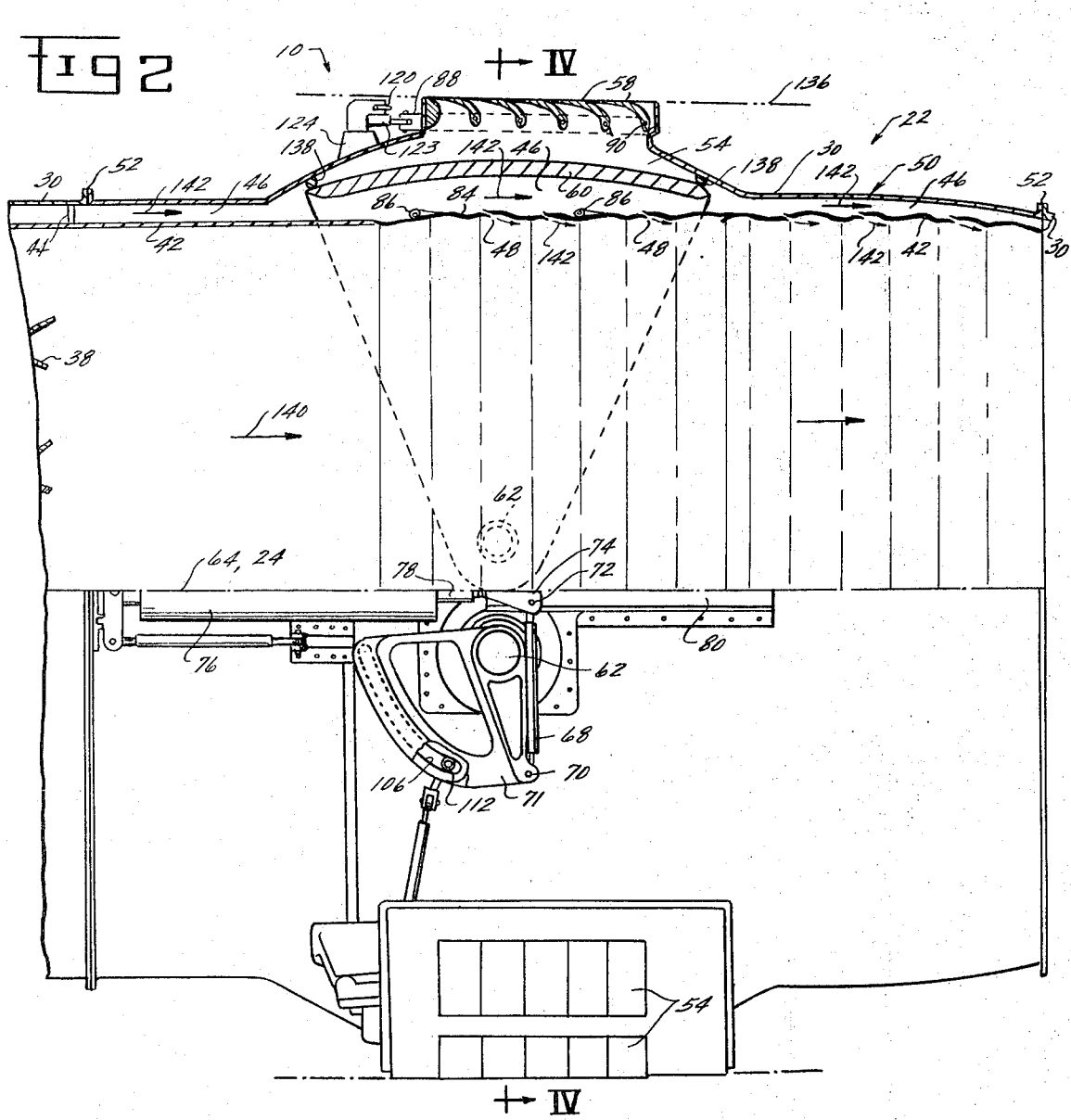
FIG. 2 is a detailed view of the exhaust duct of the gas turbine shown in FIG. 1 showing a diverter valve according to one embodiment of the present invention in its stowed position.

As hown more clearly in FIG. 2, blocker means comprise a pair of blocker doors 60 (only one of which is shown for clarity). Each blocker door 60 is mounted to duct wall 30 for rotation about a blocker axis 62 transverse to the axis 64 of duct 22. Each blocker door 60 has associated therewith a blocker door actuation mechanism which includes means for rotating the blocker door 60 about axis 62. The blocker door actuation mechanism includes a link 68 which has a first end 70 pivotably mounted to a crank 71 and a second end 72 pivotably mounted to a slide 74. A hydraulic actuator 76 has an actuator rod 78 which moves slide 74 linearly in a track 80 mounted to duct wall 30. When actuator rod 76 is in the position shown, slide 74 is in its forwardmost position and link 68 is oriented transverse to the direction of motion of slide 74. Although FIG. 2 depicts the actuation mechanism for only a single blocker door, it will be understood that the blocker door not represented in FIG. 2 has associated therewith a corresponding actuation mechanism (see FIG. 4).

Figure 3:
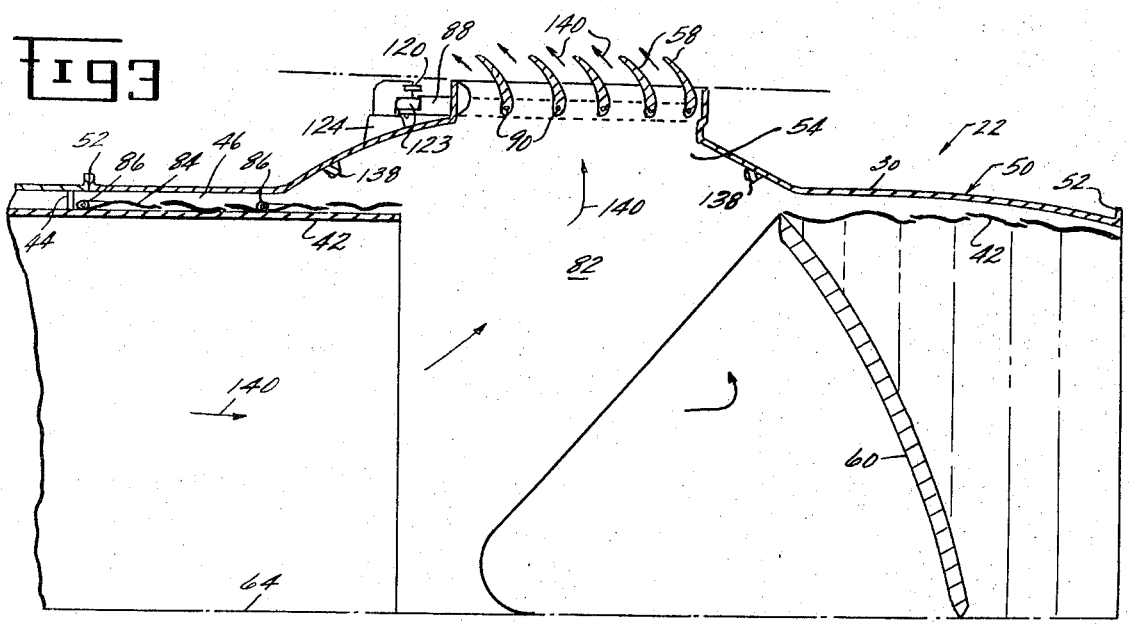
FIG. 3 is a detailed view of the exhaust duct of the gas turbine shown in FIG. 1 showing the diverter valve shown in FIG. 2 in its operative position.

Referring now particularly to FIG. 3, liner wall 42 has a portion removed to form an opening 82. A liner section 84 has rollers 86 mounted about its outer periphery, which rollers extend partially through the wall of liner section 84. Liner section 84 is movable and translates axially in telescoping relation with liner 40, with rollers 86 insuring smooth relative motion between liner section 84 and liner 40 by rolling along liner wall 42. Vanes 58 have their pitch varied by a rod 88 which moves longitudinally, rod 88 being pivotably mounted to each vane 58 at a pivot point 90.

Figure 4:
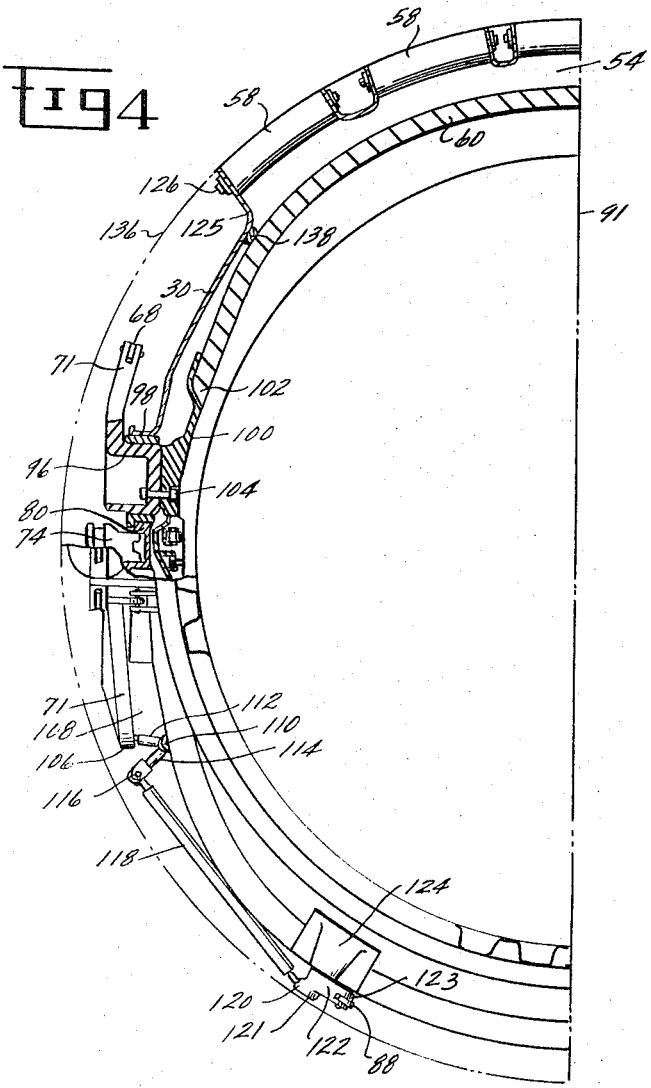
FIG. 4 is a sectional view taken along line IV—IV of FIG. 2.

Referring now to FIG. 4, the actuation mechanism for blocker doors 60 and vanes 58 is shown in detail. It is understood that only half of exhaust duct 22 is shown and the other half is preferably a mirror image about broken line 91. It will be necessary when using two cranks 71 for each blocker door 60 to use two actuators 76, which actuators must be synchronized in any manner which is well known in the art. Means for rotating the blocker door includes crank 71 and a shaft 96 which is mounted through duct wall 30 by a bearing 98. Shaft 96 has a first end suitably secured to one of the blocker doors 60 and a second end integral with, or otherwise suitably secured to, corresponding crank 71. Blocker door 60, shown as being of honeycomb construction, includes two lugs 100 to which the honeycomb portion is suitably attached, as shown at 102, with the first end of shaft 96 secured to lug 100 by bolts 104 (only one of which is shown for clarity). However, those skilled in the art will perceive other constructions for blocker doors 60 and it is intended uhat they be within the scope of the present invention.

To vary the pitch of vanes 58, crank 71 includes a cam track 106 (see FIG. 2). A first bell crank 108 is pivotably mounted to duct wall 30 at pivot point 110. First bell crank 108 has a first leg 112 disposed in cam track 106 and a second leg 114 pivotably secured to the first end 116 of link 118. The second end 120 of link 118 is pivotably secured to the first leg 121 of a second bell crank 122. The second leg 123 of second bell crank 122 is pivotably secrued to rod 88 (best seen in FIG. 3). Second bell crank 122 is suitably mounted to duct wall 30 for rotation, as by casting 124. Each vane 58 is pivotably mounted, at pivot point 126, to a flange 125 on duct wall 30, pivot point 126 being spaced from pivot point 90 so that longitudinal motion or rod 88 varies vane pitch.

Referring now to FIG. 5, the actuation mechanism for liner section 84 is shown in detail. A second, identical actuation mechanism is preferably associated with a slide (not shown) on the opposite side of exhaust duct 22 (see FIG. 4). A forward pulley 127 and aft pulley 128 are mounted to duct wall 30 in protrusions 129 and an endless cable 130 extends around pulleys 127 and 128. Openings are provided in protrusions 129 so that a first portion 131 of cable 130 is located externally of exhaust duct 22 and a second portion 132 is located internally of exhaust duct 22. First portion 131 is suitably secured to slide 74 and second portion 132 is suitably secured, as by bracket 134, to liner section 84 so that the actuation mechanism for liner section 84 cofunctions with the blocker door actuation mechanism.

In operation, each blocker door 60 has a stowed position and an operative position. FIGS. 2 and 4 show the position of the various parts of diverter valve 50 when blocker doors 60 are in their stowed position, wherein they replace the portions of exhaust duct wall 30 which were removed to form openings 54. Accordingly, vanes 58 are in their folded position and are flush with flanges 125. Gas tubine 10 is mounted interiorly of an engine nacelle, represented by broken line 136, and flanges 125 extend outwardly so that they are flush with the nacelle so that when vanes 58 are folded, the nacelle presents a smooth aerodynamic surface. Further, when blocker doors 60 are in their stowed position, liner section 84 is in a first position (shown in dotted lines in FIG. 5) wherein liner section 84 replaces that portion of liner wall 42 which was removed to provide opening 82. Blocker doors 60 are sealed to duct wall 22 by suitable means such as seals 138. Discharge stream 140 of gas turbine 10 flows uninterrupted to discharge nozzle 23 and the flow of cooling air 142 is directed through annular space 46 in order to cool duct wall 30 and liner wall 42, as described above. Because blocker door 60 and liner section 84 effectively become a part of duct wall 30 and liner wall 42, respectively, the presence of diverter valve 50 does not interrupt the flow of cooling air and augmenter 20 may be operated without regard to the presence of diverter valve 50.

FIGS. 3 and 5 show the position of the various parts of diverter valve 50 when blocker doors 60 are in their operative position. Accordingly, when it is desired to divert a portion of discharge flow 140 through apertures 54, in order to provide reverse thrust, hydraulic fluid is introduced to actuator 76 causing actuator rod 78 to move aft, which causes slide 74 to move axially aft in track 80. However, the rotation of crank 71 is slightly delayed since link 68 is oriented transverse to the direction of motion of slide 74 when blocker door 60 is in its stowed position (see FIG. 2). This slight delay in the rotation of crank 71 delays rotation of blocker door 60 until link 68 travels aft and thus allows cable 130 to begin translating liner section 84 forward in order to provide an opening through which blocker doors 60 can pass in order to extend into the discharge stream. As actuator rod 76 continues to move axially, blocker door 60 is rotated so that it extends transversely into discharge stream 140 and liner section 84 continues to translate forward into a second position wherein it telescopes with cooling liner 40 and exposes opening 82 in liner wall 42. The rotation of crank 71 simultaneously causes first bell crank 108 to pivot about point 110 due to the configuration of cam track 106. As first bell crank 108 pivots, link 116 is moved longitudinally which pivots second bell crank 122, causing rod 88 to translate longitudinally, thereby changing the pitch of vanes 58 and exposing openings 54. When the diverter valve of the present invention is to be used as a thrust reverser, vanes 58 are constructed so that discharge flow 140 is directed forward to produce a reverse thrust component when vanes 58 are in their open position.

Although FIG. 3 shows all of discharge flow 140 being diverted through openings 54, it is possible to rotate blocker doors 60 into an operative position wherein they only partially extend into the discharge stream, in which position there will be an opening between them, thus allowing a certain amount of discharge flow to pass therethrough and continue to discharge nozzle 23. In order to provide optimum performance of gas turbine 10, the total exhaust area through openings 54 and discharge nozzle 23 must remain substantially constant. This can be easily accomplished with the present invention by configuring cam track 106 to vary the pitch of vanes 58, and thus the area of openings 54, so that the total exhaust area remains constant. This provides for thrust modulation so that a selected amount of reverse thrust or diverted discharge flow can be attained without degrading the performance of gas turbine 10.

In order to return blocker doors 60 to their stowed position, it is only necessary to introduce hydraulic fluid to actuator 76 in a manner which causes actuator rod 78 to move slide 74 forward in track 80. Blocker doors 60 thus rotate back into their stowed position where they replace the portion of duct wall 30 which was removed to form openings 54. Simultaneously, cam track 106 and bell cranks 108 and 112 cause vanes 58 to close flush with flanges 125 and endless cable 130 causes liner section 84 to translate aft where it replaces that portion of liner wall 42 which was removed to form opening 82.

it is apparent that vanes 58 perform several functions in the operation of the present invention. Among these functions are serving to close openings 54 so that the engine nacelle is aerodynamically smooth, directing discahrge flow forwardly to provide reverse thrust, and varying the area of openings 54 to maintain a constant total exhaust area for gas turbine 10. However, it will be obvious to one skilled in the art that the diverter valve of the present invention is not limited to use as a thrust reverser, and when its use is to perform other functions, orientation of vanes 58 may be changed, or vanes 58 may be omitted altogether, without departing from the spirit of the invention.

A second embodiment of the present invention is shown in detail in FIGS. 6 and 7. In this embodiment, the configuration of the movable liner section is varied. In some gas tubines, other design considerations necessitate disposing diverter valve 50 nearer to the forward end of exhaust duct 22 than is shown in FIG. 1. In such configurations, if the movable liner section translated forward, it would interfere with other structure, for example, spray bars 34 or brackets 44. In such situations, it is desirable to translate the liner section aft where sufficient room is available. However, reference to FIGS. 2 and 3 will show that if a movable liner section such as liner section 84 is used in this situation, the entire translation must be completed before blocker doors 60 can begin to rotate.

In accordance with these requirements, a movable liner section comprises portions 144 and 146. Blocker doors 60' (only one of which is shown for clarity) have portion 144 (represented schematically) of the movable liner section suitably mounted thereto, as by brackets 145. Portion 146 is axially translatable and is actuated by a cable drive mechanism similar to that described in detail in FIG. 5, except that to provide aft translation of portion 146 as slide 74 moves aft, an additional turn of cable 130 must be provided, with the attendant modifications of pulleys 127 and 128 and connection to crank 71, which modifications will be clear to those skilled in the art.

In operation, blocker door 60' is rotated by actuator 76 and crank 71 as described above. Vanes 58 may also be provided which are actuated in a manner described above. As slide 74 begins to move axially aft, portion 146 is translated axially aft to telescope with liner 40. Because link 68 is initially transverse with respect to motion of slide 74 when blocker door 60' is in its stowed position, rotation of blocker door 60' is delayed until axially translatable portion 146 has translated a distance sufficient to provide clearance for blocker doors 60' to rotate into their operative position. Blocker doors 60' then begin to rotate due to the action of link 68 and slide 74 so that all or a portion of discharge stream 140 is diverted through openings 54.

The actuation mechanism shown herein is not intended to be exclusive of other arrangements for moving the axially translatable portions of the movable liner section, for example, a linkage system could be provided whereby slide 74 is secured to one end of a link having its other end secured to a crank with its shaft extnding through duct wall 30. The end of the shaft disposed interiorly of exhaust duct 28 is also provided with a crank which drives one end of a second link secured thereto, the other end of the second link being secured to the axially translatable portion of the liner. When slide 74 moves axially, the system of links acts as a lever arm to translate the liner section.

Also, it is not intended that the present invention be restricted to the use of a pair of blocker doors. It is possible, for example, to have a single blocker door large enough to divert all of discharge flow 140 when it is rotated into its operative position. Such an arrangement is particularly useful in a gas turbine used for vertical take-off applications. In such an application, a single opening in the exhaust duct wall would be provided at the bottom of gas turbine 10. When the blocker door was in its operative position, vanes in the opening would be disposed so that the discharge flow 140 which is diverted through the opening would provide a vertical component of thrust. Note that the thrust modulation feature of the present invention is particularly useful with such an arrangement, since the transition from the vertical thrust mode to the forward thrust mode, in which the discharge flow passes uninterrupted to discharge nozzle 23, must be accomplished without degradation of gas turbine performance. This is particulary critical since the transition usually takes place when the aircraft has very little forward velocity and any degradation of performance will cause rapid loss of altitude.

It will also be obvious to one skilled in the art that the diverter valve of the present invention is not limited to use with a gas turbine having an augmenter. It is sometimes desirable to provide a cooling liner for the exhaust duct of gas turbines which do not have augmenters and the diverter valve herein described may be used in such a gas turbine without departing from the spirit of the invention.

Although several specific embodiments of the present invention have been shown, those skilled in the art will perceive modifications other than those specifically pointed out which can be made without departing from the invention, and it is intended by the appended claims to cover all such modifications as fall within the true spirit and scope of the invention.

What is claimed as new and desired to be secured by letters Patent of the United States is:

1. A diverter valve for controlling the direction of the discharge stream of a gas turbine, the diverter valve comprising:

a. an exhaust duct including a generally cylindrical duct wall having a portion thereof removed to form an opening in said duct wall;

b. a cooling liner including a generally cylindrical liner wall having a portion thereof removed to form an opening in said liner wall, said cooling liner being fixed interiorly of said exhaust duct defining an annular space therebetween;

c. blocker means including a blocker door mounted to said duct wall for rotation about a blocker axis transverse to the axis of said exhaust duct, said blocker foor being rotatable between a stowed position and an operative position wherein:
   i. said blocker door replaces said removed portion of said exhaust duct when in said stowed position, and
   ii. said blocker door extends transversely into said discharge stream through said opening in said liner wall to divert at least a portion of said discharge stream through said opening in said liner wall and duct wall when in said operative position;

d. a liner section movable between a first position and a second position wherein:
   i. said liner section is in said first position when said blocker door is in said stowed position, said liner section replacing said removed portion of said liner wall when in said first position, and
   ii. said liner section is in said second position when said blocker door is in said operative position, at least a portion of said opening in said liner wall being exposed when said liner section is in said second position, and
   iii. said liner section includes a portion axially translated into telescoping relation with said cooling liner when said liner section is in said second position.

2. The diverter valve recited in claim 1 further comprising a blocker door actuation mechanism including:

a. means for rotating daid blocker door about said blocker axis including a crank and a shaft having a first end cooperating with said blocker door and a second end cooperating with said crank;

b. a slide movable parallel to the axis of said exhaust duct in response to an actuation force; and c. a link having a first end pivotably mounted to said crank and a second end pivotably mounted to said slide so that axial movement of said slide rotates said crank whereby said blocker door is rotated between said stowed and said operative positions.

3. The diverter valve recited in claim 2 further comprising a liner section actuation mechanism including:

a. a forward pulley mounted to said duct wall;
b. an aft pulley mounted to said duct wall;
c. an endless cable extending around said forward and aft pulleys, said endless cable having a first portion external of said exhaust duct, said first portion being secured to said slide and a second portion internal of said exhaust duct, said second portion being secured to said portion of said liner section so that axial movement of said slide translates said portion of said liner section.

4. The diverter valve recited in claim 3 wherein said blocker door is in said stowed position when slide is in its forwardmost position, said link being initially transverse with respect to motion of said slide when said slide is in said forwardmost position so that rotation of said crank is delayed during initial aft movement of said slide, whereby rotation of said blocker door is delayed during said initial aft movement of said slide.

5. The diverter valve recited in claim 3 wherein said portion of said liner section is translated generally axially forward by aft movement of said slide.

6. The diverter valve recited in claim 3 wherein:
a. said liner section further includes a second portion mounted to said blocker door; and
b. said first-mentioned portion of said liner section is translated axially aft by aft movement of said slide.

7. The diverter valve recited in claim 1 further comprising a plurality of variable pitch vanes disposed in said opening in said duct wall, said vanes being rotatable between a folded position and an open position wherein:
a. said vanes are in said folded position when said blocker door is in said stowed position, said vanes closing said opening when in said folded position; and
b. said vanes are in said open position when said blocker door is in said operative position, said vanes exposing a portion of said opening in said duct wall when in said open position.

8. The diverter valve recited in claim 7 further comprising:
a. a blocker door actuation mechanism including:
   i. means for rotating said blocker door about said blocker axis including a crank having a cam track of a predetermined configuration, and a shaft having a first end secured to said blocker door and a second end secured to said crank,
   ii. a slide movable parallel to the axis of said exhaust duct in response to an actuation force, and
   iii. a link having a first end pivotably mounted to said crank and a second end pivotably mounted to said slide so that axial movement of said slide rotates said crank whereby said blocker door is rotated between said stowed and said operative positions;
b. a liner section actuation mechanism including:
   i. a forward pulley mounted to said duct wall,
   ii. an aft pulley mounted to said duct wall, and
   iii. an endless cable extending around said forward and aft pulleys, said endless cable having a first portion external of said exhaust duct, said first portion being secured to said slide and a second portion internal of said exhaust duct, said second portion being secured to said portion of said liner section so that axial movement of said slide translates said portion of said liner section; and
c. a vane actuation mechanism including:
   i. a first bell crank pivotably mounted to said duct wall and having a first leg disposed in said cam track for pivoting said first bell crank in response to said configuration of said cam track and a second leg,
   ii. a link having a first end pivotably secured to said second leg of said first bell crank and a second end,
   iii. a second bell crank pivotably mounted to said duct wall and having a first leg pivotably secured to said second end of said last-mentioned link and a second leg, and iv. a rod pivotably mounted to each vane for changing the pitch of said vane in response to longitudinal movement of said rod, said rod being pivotably secured to said second leg of said second bell crank so that pivoting said second bell crank moves said rod longitudinally.

9. The diverter valve recited in claim 8 wherein said configuration of said cam track pivots said first bell crank so that the pitch of said vanes when in said open position is dependent on the amount of rotation of said crank whereby the amount of said opening in said duct wall which is exposed is dependent on the amount of rotation of said blocker door.

10. The diverter valve recited in claim 9 wherein said configuration of said cam track pivots said first bell crank so that said vanes form a flush surface when in said folded position.

11. The diverter valve recited in claim 1 wherein:
a. said duct wall has a second portion thereof removed to form a second opening;
b. said blocker means further includes a second blocker door mounted to said duct wall for rotation about a second blocker axis transverse to the axis of said exhaust duct, said second blocker door being rotatable between a stowed position and an operative position wherein:
  i. said second blocker door replaces said second removed portion of said exhaust duct when in said stowed position, and
  ii. said second blocker door extends transversely into said discharge stream through said opening in said liner wall to divert at least a portion of said discharge stream through said opening in said liner and said second opening in said duct wall when in said operative position.

* * * * *